United States Patent [19]

Labaune et al.

[11] 4,357,507

[45] Nov. 2, 1982

[54] ELECTROMECHANICAL ARRANGEMENT FOR AUTOMATIC RETURN OF ELECTRONIC BLINKER LOCATED ON THE STEERING COLUMN OF A MOTOR VEHICLE

[75] Inventors: Camille Labaune, Fourgueux; Gilles Leconte, Paris, both of France

[73] Assignee: Regie Nationale des Usines Renault, Boulogne-Billancourt, France

[21] Appl. No.: 120,316

[22] Filed: Feb. 11, 1980

Related U.S. Application Data

[63] Continuation of Ser. No. 942,308, Sep. 14, 1978, abandoned.

[30] Foreign Application Priority Data

Sep. 14, 1977 [FR] France ................................ 77 27712

[51] Int. Cl.³ .............................................. H01H 3/16
[52] U.S. Cl. ................................. 200/61.27; 200/61.3; 200/61.54
[58] Field of Search ................. 200/61.27, 61.3–61.38, 200/61.39, 61.54; 335/205, 206, 207

[56] References Cited

U.S. PATENT DOCUMENTS

| 2,604,560 | 7/1952 | Dibelka . | |
|---|---|---|---|
| 2,781,429 | 2/1957 | Mappes et al. | 200/61.37 |
| 2,830,146 | 8/1958 | Lauer | 200/61.37 |
| 2,917,725 | 12/1959 | Pearl . | |
| 3,622,722 | 11/1971 | Jackson et al. | 200/61.39 |
| 4,081,634 | 3/1978 | Bull | 200/61.54 X |

FOREIGN PATENT DOCUMENTS

| 2432872 | 1/1976 | Fed. Rep. of Germany ... 200/61.54 |
| 2837903 | 4/1979 | Fed. Rep. of Germany ... 200/61.54 |
| 2109140 | 5/1972 | France . |

Primary Examiner—James R. Scott
Attorney, Agent, or Firm—Oblon, Fisher, Spivak, McClelland & Maier

[57] ABSTRACT

An electromechanical arrangement for automatic return of an electronic blinker located on a steering column of a motor vehicle includes a movable arm carrying a magnet at its free end and slaved at its other end by the intermediary of a roller to the rotation of the steering column of the motor vehicle. Reed ampulses disposed in fixed positions permit detection of predetermined values of angles of rotation of the steering column.

9 Claims, 18 Drawing Figures

ELECTROMECHANICAL ARRANGEMENT FOR AUTOMATIC RETURN OF ELECTRONIC BLINKER LOCATED ON THE STEERING COLUMN OF A MOTOR VEHICLE

This is a continuation of application Ser. No. 942,308, filed Sept. 14, 1978, now abandoned.

BACKGROUND OF THE INVENTION

Field of the Invention

The present invention relates to an electromechanical arrangement for automatic return of an electronic blinker located on the steering column of a motor vehicle.

In French patent application No. 76/32 563 filed Oct. 28, 1976, now French Pat. No. 2369124 dated June 12, 1981, by the present applicant for "Momentary Control of the Electrical Equipment of a Motor Vehicle, in Particular Outside Lights", there is schematically illustrated a mechanical arrangement permitting determination of the sense of rotation of a steering wheel comprising a longitudinal axis fixed at one end to a slip ring integral with the hub of the steering wheel and closing a contact AG or AD with its other end, depending upon whether the wheel is turned to the right or the left, with each contact being associated with an interrupter.

The present invention concerns a practical realization of such an arrangement.

According to the invention, an electromechanical arrangement for the automatic return of an electronic blinker, which is located on the steering column of a motor vehicle comprising a movable arm pivoting under the action of rotation of the steering column and closing a contact with its other end when the steering column has turned through a certain angle in one sense or the other, is characterized by the fact that the movable arm is integral with at least one roller always riding against the steering column near one of its ends, while at its other end it carries means capable of opening and closing a switch when the movable arm (and, consequently, the steering column) has turned through the preset maximum angle in one direction or the other, and by the fact that means for detecting the rotation of the movable arm by the maximum allowable amount are disposed at fixed positions at the same angular distance and at the same radial distance on either side of the plane of symmetry of the mechanical arrangement.

SUMMARY OF THE INVENTION

Advantageously, according to one mode of realization of the invention, the means carried at the free end of the movable arm consists of a magnet and the means for detecting the rotation through the maximum allowed angle consists of either flexible strip switches in glass bulbs or of coils.

According to one characteristic of the invention, each flexible-strip switch in a glass bulb is carried in a holder assuring its precise positioning and its terminals are connected by soldering or by crimping to brass or copper clips forming conducting leads extending through an opening made through a part of the housing containing the electromechanical arrangement so as to constitute the male part of a connector.

According to one mode of realization of the present invention, the roller which always rides against the steering column is composed of two rollers separated by an inverted cup containing a spring coaxial with a shaft which carries the movable arm as well as the two rollers and the cup, so that the outside of the bottom of this cup is continuously pressed by one end of the spring against one of the two rollers, while the movable arm is continuously pressed by the other end of the spring against the other roller.

According to another characteristic, the shaft carrying the movable arm, the rollers and the cup are pressed at each of their ends by a thruster constituting a hollow movable part sliding in the interior of each body making up the housing of the electromechanical arrangement, parallel to a wall of the body constituting the cover of the thruster and containing within it a spring pressing against a part of the body essentially perpendicular to the cover of the thruster which always tends to push away the bottom of the hollow cylindrical part of the thruster from the part of the body essentially perpendicular to the cover.

According to another characteristic a second magnet of reverse polarity from that of the magnet carried by the movable arm may be disposed near the vertex of the acute angle formed by the flexible-strip switches in glass bulbs.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENTS

Figure 1:
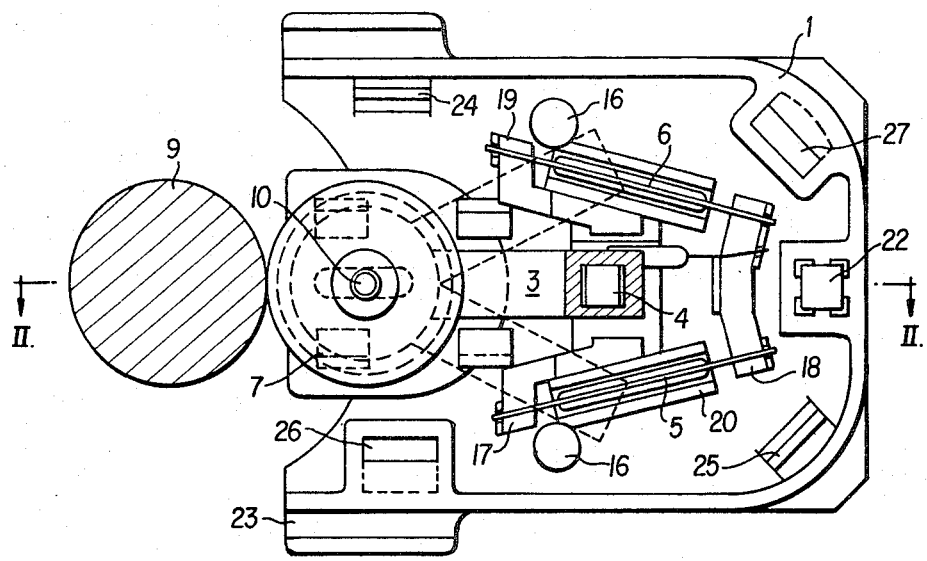
FIG. 1 is a cross section view in a plane I—I through FIG. 2, of the electromechanical arrangement of the present invention.
Figure 2:
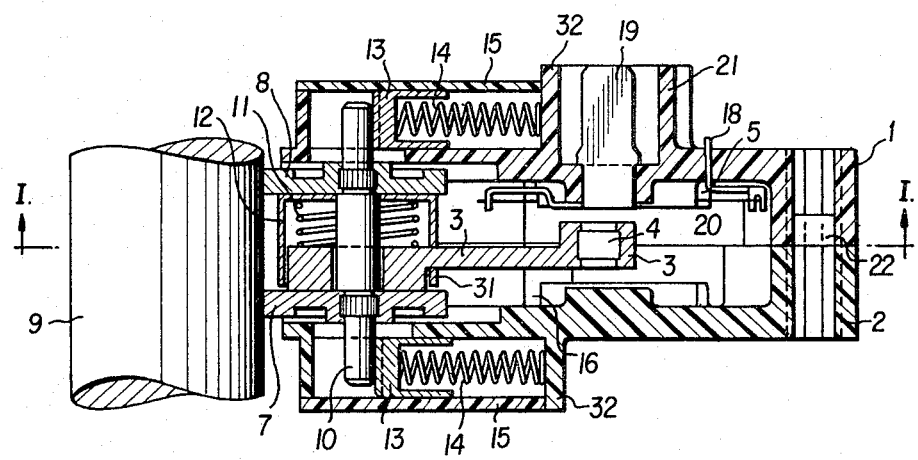
FIG. 2 is a front view in section through a plane II—II in FIG. 1, of the electromechanical arrangement of the present invention.
Figure 3:
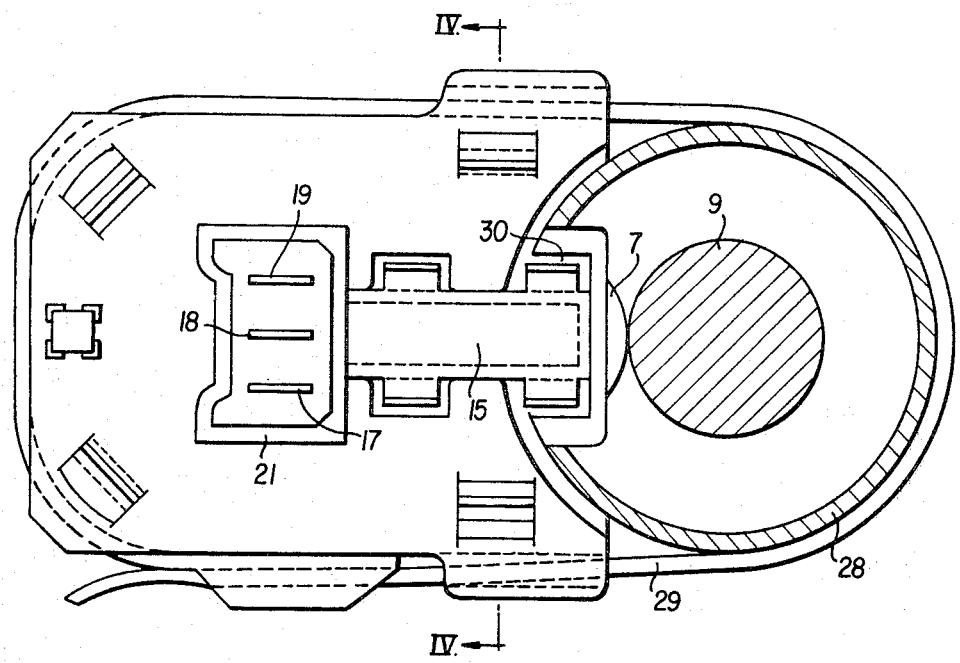
FIG. 3 is a top view of the electromechanical arrangement of the present invention.
Figure 4:
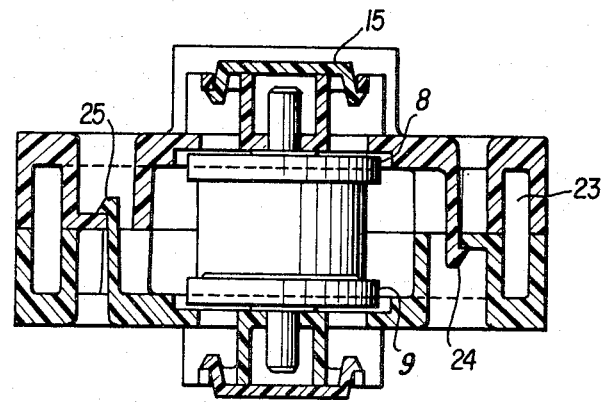
FIG. 4 is a side view in cross section in a plane IV—IV through FIG. 3, limited to the housing to show the detail of the mating of the two identical bodies which form the same.

According to the mode of realization illustrated, FIG. 3 shows that the steering column 9 of the motor vehicle is equipped with a fixed sleeve 28 within which the steering column 9 can turn freely and in which there is cut a rectangular hole 30 for engagement of the automatic return sensor for the blinker illustrated in FIGS. 1 and 2, which is enclosed in a housing composed of two essentially identical bodies 1 and 2 represented in FIGS. 1, 2 and 4. The housing 1, 2 is attached to the sleeve 28 by means of a strip 29, of a cable-clamping type, as seen in FIG. 3. This fastening strap 29 passes through openings 23 seen in FIGS. 1 and 4. These openings are formed in the lateral walls of the housing 1, 2 so as to assure perfect solidarity of the sensor with the sleeve 28 of the steering column 9 without risk of slipping. Reference numbers 24 and 25 in FIGS. 1 and 4 designate catches such that the two identical bodies 1 and 2 forming the housing can be snapped together. Reference numbers 26 and 27 in FIG. 1 denote holes for passage of the snap catches, the bodies 1 and 2 of the housing being thus held firmly together.

According to FIG. 2, there is provided inside the housing 1, 2 a movable arm 3 carrying at one end thereof a small magnet 4, the arm being attached near its other end by means of a common axis or shaft 10 to rollers 7, 8 separated by an inverted cup 12 through the side of which the movable arm 3 passes via an opening 31. The cup 12 rides via its external bottom surface on the under side of roller 8. A spring 11 coaxial with the shaft 10 situated between the internal bottom surface of the cup 12 and the upper surface of the movable arm 3 tends to push the movable arm 3 away from the bottom of the cup 12, so as to assure excellent frictional contact, on the one hand, between the external bottom surface of the cup 12 and the roller 8 and, on the other hand, between the movable arm 3 and the second roller 7. Further, two lateral thrusters 13 situated one in the upper body 1 and the other in the lower body 2 of the housing each encloses a spring 14 contained within the cover 15 of the thruster 13 which press against a vertical surface 32 on each of the bodies 1, 2 in such a way as to exert a continual pressure on the two ends of the shaft 10 and consequently hold the rollers 7 and 8 in constant contact with the steering column 9, so that the least rotation of the steering column 9 in one direction or the other is transmitted via the rollers 7, 8 and the shaft 10 in the reverse direction to the movable arm 3 carrying the magnet 4.

Returning now to FIG. 1, reference numbers 17, 18, 19 denote brass or copper clips to which are attached by soldering or crimping two flexible strip switches in glass envelopes, e.g. two REED ampules 5 and 6, which are inserted in known circuits for controlling turn signal lights and the like, such as those which are described in French patent application No. 76/ 32 563 filed Oct. 28, 1976, rest in troughs 20 in order to assure precise positioning of the ampules. The REED ampule 5 extends between the clips 18, 17. These clips project into an opening or cylindrical structure 21 formed in the upper body 1 of the housing and terminate in the form of electrodes visible in FIGS. 2 and 3, so that one can plug in a connector (not shown) from the outside for transmission of the voltages appearing at the terminals of the REED ampules 5 and 6. FIG. 1 is symmetrical with respect to the plane through the line II—II corresponding to the section shown in FIG. 2 and the REED ampules 5 and 6 make the same acute angle with the plane through line II—II. FIG. 2 shows that the troughs 20 supporting the REED ampules 5 and 6 are situated in a plane parallel to that in which the movable arm 3 carrying its magnet 4 moves, so that they in no way hinder the motion of the movable arm 3, the rotation of which both right and left is limited by stops 16 visible in FIG. 1.

An optional second magnet 22, of reverse polarity from that of the first magnet 4, carried by the movable arm 3, is placed in the body 1 of the housing near clip 18 at one end of the REED ampules 5 and 6 with a view to polarizing in a constant manner one end of the ampules and consequently increasing the sensitivity to the first magnet 4 even further.

The operation of the arrangement of the invention as described above is apparent to one skilled in the art. The movable arm 3 integral with the rollers 7 and 8 is driven by rotation of the steering column 9 of the motor vehicle and, because of the small magnet 4 which it carries at its free end, closes one of the REED switches 5 or 6 radially disposed while it opens the other according to the position of the magnet 4 relative to them. These REED ampules 5 and 6 are each inserted in a known electrical circuit which is completed or broken in synchronism with the position of the magnet 4, and the connection of the REED ampules in the corresponding circuits is effected simply via the opening or cylindrical structure 2 and electrodes 17, 18 and 19. Again, the electrical circuits have been described in French patent application No. 76/ 32 563, cited at the beginning of the present application, which will now be described with respect to FIGS. 5–18.

Figure 5:
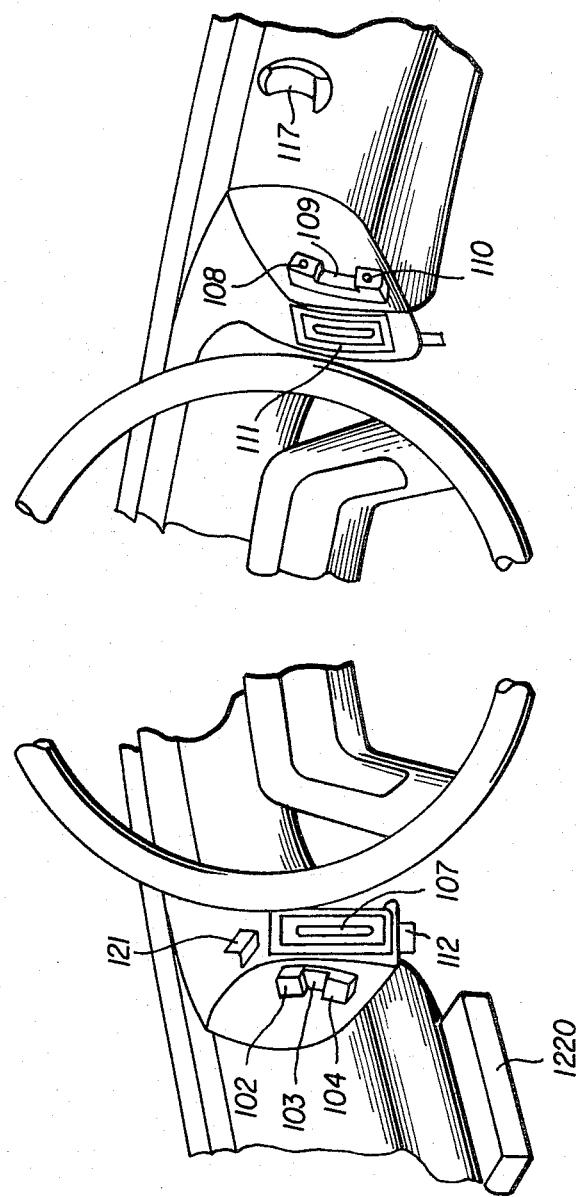
FIG. 5 illustrates the dashboard or instrument panel of a motor vehicle equipped with various switches of the transient contact and short-stroke type according to this invention.

Referring then to FIG. 5 and according to a first feature of French Application No. 76/32 563, the various controls for the headlights, windshield wiper, windshield washer pump and directional signal flashers are assembled and disposed around the steering wheel as follows:

On the left-hand side: the flashing direction indicators or signal lamps are controlled by means of a three-way switch, as follows:

in the upper position, as at 102, the right-hand flash signal lamps are energized;

in the central position, as at 103, the direction indicators or signal lamps are put out or stopped on purpose, that, by a direction of the driver;

in the lower position, as at 104, the left-hand flash lamps are energized.

Also on the left-hand side, the headlights are controlled by means of a double control switch designated by reference numerals 107 and 112.

On the dashboard or instrument panel, a three-way switch 121 is provided for selecting the positions corresponding to daylight, town and open road driving.

On the control plate, a transient-action switch 107 permits a reversing of the dimmed-headlight to sidelamp positions and also the dimmed-headlight to main-beam headlight positions according to the momentary position of the control member of the general lighting switch 121 and also to the highway code regulations in force in the Country contemplated.

Each time the general lighting switch 121 or the transient switch 112 (for flashing the main-beam headlights) is actuated, the state of the vehicle lighting is modified also as a function of the highway code regulations of the Country concerned.

On the right-hand side: the windshield wiper motor is controlled by means of a three-way switch, as follows:

in the upper position, the wiper blades are reciprocated once at eight seconds' intervals (reference numeral 108);

in the lower position: the two wiper speeds can be inverted: from low speed to high speed, and vice versa (reference numeral 110), and in the intermediate or central position, the wiper blades are stopped and can be operated to perform single, manually controlled strokes (reference numeral 109);

Another separate switch 111 is provided for actuating the electric pump of the windshield washer together with the windshield wiper with a four-second time extension for the latter.

Of course, other switch arrangements may be contemplated if desired for obtaining the above described control actions, such as:

Utilizing transient switches assembled by three with, centrally of each three-switch block, a warning or emergency control element, for instance:

one element for stopping the flashers;

a second element for actuating the horns centrally of the headlight control member, and a third element for energizing the windshield washer electric pump combined with an extension of the windshield wiper operating time.

In the case of a right-hand mounted steering wheel, the mounting plate 1220 on which the computer 120 and the power members are assembled is disposed on the left-hand side under the dash board or instrument panel.

Figure 6:
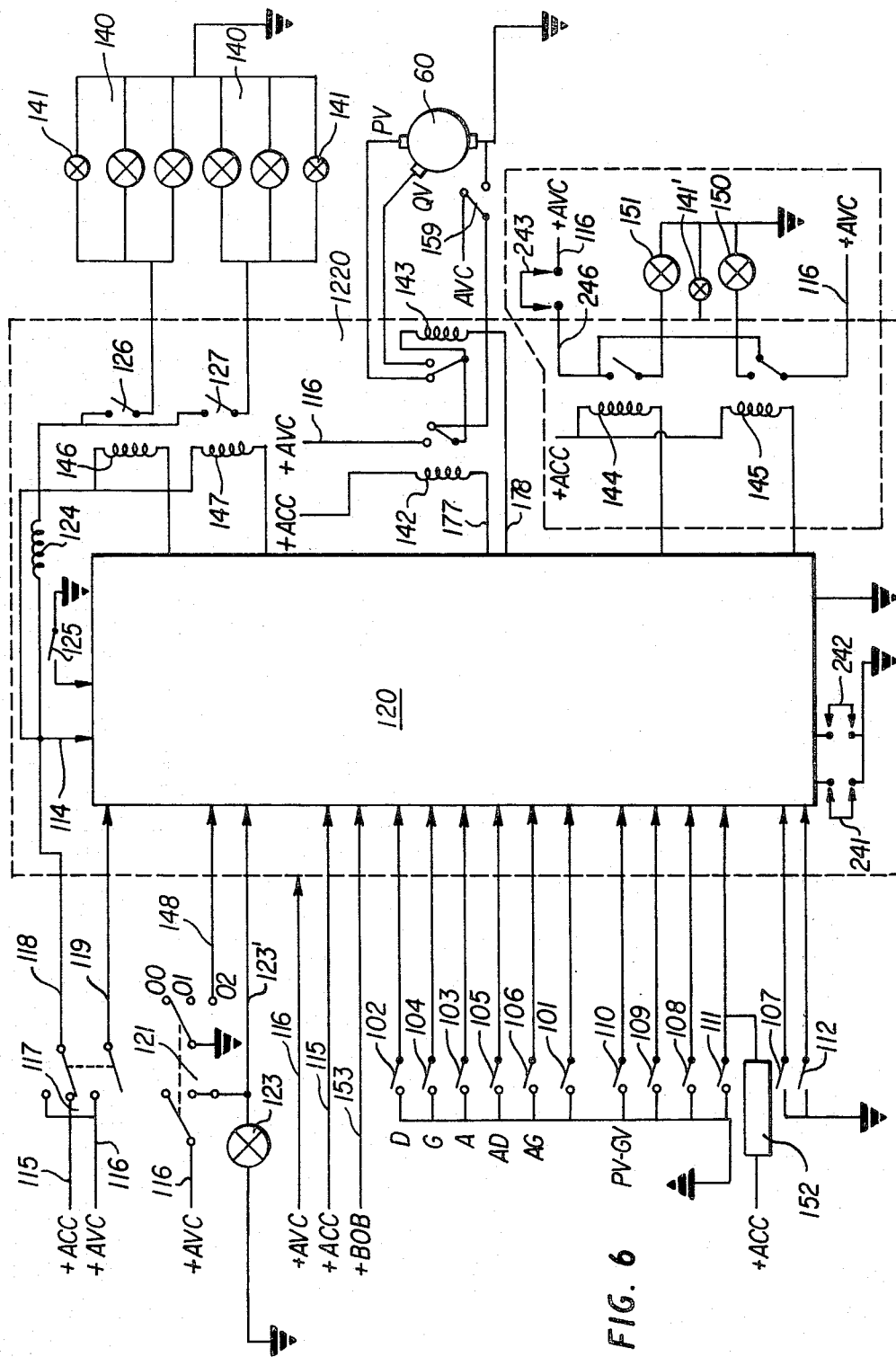
FIG. 6 is the block diagram of the signal control circuit according to the instant invention.

Referring now to FIG. 6 and considering this figure from left to right, it will be seen that all the input control utilizing transient, short-stroke contacts have been assembled in the left-hand portion of the figure. In the center, the mounting plate 1220 (in dash line) comprises a computer 120, relays 142 to 147 controlling directly the operation of the signal members such as flashing directional indicators 140, pilot light 141, main beam headlights 150, dimmed beam headlights 151 and a two-speed windshield wiper motor 160; however, this list should not be considered as a limiting or exhaustive one, since other devices and apparatus, such as fog lamps, and the like, may be included therein.

Reverting to the left-hand side of FIG. 6, there is shown a succession from top to bottom: a double switch 117 also illustrated on the instrument panel in the right-hand portion of FIG. 1, which is adapted to receive on its primary contacts via a wire 115 a "+ accessories" voltage (+ACC) and via another wire 16 a "+ before contact" voltage (+AVC), respectively. The term "accessories" utilized herein designates apparatus and devices such as a radio receiver, cassette recorders and players windshield wipers and directional signal lamps or flashers. The secondary contacts of double switch 117 are connected on the one hand via a wire 119 to one input of computer 120 for delivering a warning signal thereto, and on the other hand via another wire 118 to the energizing coil 124 of a REED relay of which the movable contact arm 125 is branched between the ground and another input of computer 120 via a wire 114 for detecting the current intensity, and thence to the parallel-connected movable contact arms 126 and 127 of a pair of noise-producing relays, to a pair of directional signal lamps 140 and also to a pilot light 141 which are connected in parallel between the ground and each movable contact 126, 127. On the other hand, the energizing coils 146 and 147 of the pair of noise-producing relays are connected in parallel between wire 118 and two outputs of computer 120. This wire 118 is also connected to one input of computer 120 for energizing the power section thereof which is to supply current to the directional flasher system as will be explained presently with reference to FIG. 6.

A general lighting switch 121 comprises a set of three primary and secondary contacts 00, 01 and 02. A movable primary contact arm is connected via wire 116 to the "++before contact" terminal (+AVC) and the pair of lower primary contacts are connected to the side or fender lights 123 and thence on the one hand to the ground and on the other hand via wire 123' to one input of computer 120 in order to deliver the necessary voltage, namely "+ side lamp" voltage. The lower secondary contact designated by the reference numeral "102" is connected to another input of computer 120 via a wire 148 and the latter is grounded when the movable contact arm co-acting with the various secondary contacts engages contact "102", said movable contact arm is grounded.

Below the general lighting switch 121 are two sequential wires 115 and 153 transmitting to two inputs of computer 120 and "+ accessories" (+ACC) and "coil" (+BOB) voltages. A third wire 116 feeds a "+ before contact" voltage (+AVC) for the relay power controls as explained hereinafter.

Below these three wires, a series of twelve transient control switches designated by reference numerals 1 to 12 are shown as having their inputs grounded in parallel and their outputs connected to as many inputs of computer 120. These transient control switches have the following functions:

Switch 1: distance-responsive flasher return; this switch is located either behind the speedometer or at the change-speed mechanism output on the speedometer transmission cable.

Switch 2: right-hand directional signal lamps, or flashers.

Switch 3: voluntary stopping of flashers.

Switch 4: left-hand directional signal lamps, or flashers.

Switch 5: right-hand return of flashers.

Switch 6: left-hand return of flashers.

Switch 7: main-beam to dimmed headlight, or dimmed headlight to side lamp reversing switch.

Switch 8: setting of windshield wiper sweeping rate.

Switch 9: one-stroke windshield wiper control.

Switch 10: windshield wiper normal operation at low speed and high speed.

Switch 11: windshield washer and time extension also illustrated in FIG. 5.

Switch 12: main-beam flashing control.

Of course, this list should not be construed as a limiting one since various other apparatus controls may be added thereto, as will readily occur to those conversant with the art.

The output of transient control No. 11 is connected to one terminal of an electric pump 152 delivering fluid to the windshield washer and having its other terminal connected to the "+ accessories" (+ACC) terminal.

The reader's attention is drawn on the fact that these transients, short-stroke contacts according to this invention afford easy control movements, and that in their closed position said contacts are grounded, whereby no power or live wire is directed to the mounting plate 1220 and the signal processing section can be centralized at 120 thus simplifying the wiring.

Complementary to the above described relays on the right-hand portion of FIG. 6 is a relay for energizing the headlight main beam filaments 150 which comprises a coil 145 connected between one output of computer 120 and a "+ACC" terminal, the relay's fixed terminal for closing the movable arm being connected to one side of the bulbs of said headlights 150 which have their other ends grounded. A pilot lamp 141' is connected in parallel to each headlight 150, the fixed contact of the movable arm associated with this pilot lamp being connected to the fixed terminal +AVC while its fixed opening terminal is connected to the fixed closing terminal of relay 144 for energizing the dimmed headlights 151. A pair of straps or shunts 1241,1242 are provided for adapting the circuit operation to the various international regulations and rules as will be explained presently. Relay 142 and 143 for energizing the windshield wiper motor 150 at low speed (PV) and high speed (GV) have their energizing coils 142 and 143 connected between the corresponding outputs of computer 120 and the +ACC terminal of coil 142. As to coil 143, it is connected at its second end to the fixed top of its movable arm connected in turn to the fixed top of the movable arm of relay 142. In the inoperative condition, the movable arm of relay 142 is connected to the fixed top of the movable arm of a switch 152 for automatically returning the windshield wiper blades to their inoperative position, for instance close to the bottom edge of the windshield. The movable arm of switch 159 is rigid with the output shaft of windshield wiper motor 160. In the inoperative condition, the movable contact arm of relay 143 is connected to the low-speed terminal PV of motor 160. In the operative position the movable arm of relay 142 is connected to terminal +AVC and the movable arm of relay 143 is connected to the high-speed terminal GV of motor 160. Switch 159 is of the rotary collector type of which the major portion is connected to terminal +AVC with only a small segment grounded and swept by the movable arm of switch 159 when the windshield wiper is in its inoperative position, an arrangement well known to those conversant with the art.

Figure 7:
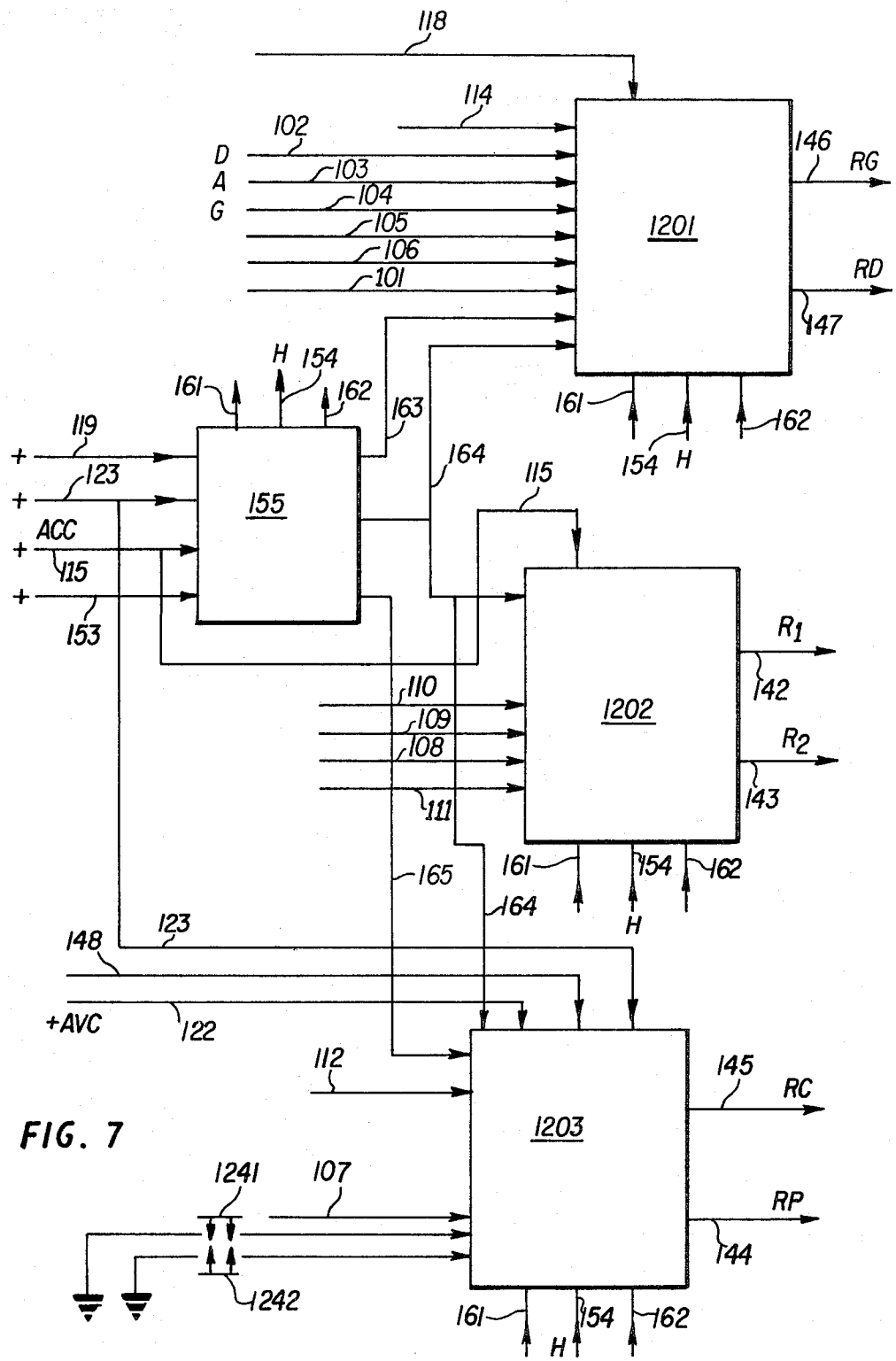
FIG. 7 illustrates more in detail the signal control circuit of FIG. 6.

FIG. 7, in which the same reference numerals designates the same component elements as in FIG. 6, it will be seen that the computer 120 comprises three essential sections, namely: a first section 1201 for processing information concerning the control of the directional indicator flashers 140; a second section 1202 for processing the information concerning the actuation of the windshield wiper in order to apply a suitable energizing current to the driving motor 160, and a third section 1203 for processing information concerning the lighting system in connection with the main beam headlights 150 and dimmed headlights 151.

The computer 120 shown in FIG. 6 further comprises a synthesis circuit 155 of which the constructional details will be described presently with reference to FIG. 8; this circuit 155 comprises four inputs connected via wire 119 to the "+ warning" terminal, via wire 123 to the "+ side lamp" terminal, via wire 115 to the "+ACC" terminal, and via wire 153 to the "+ coil" terminal. Three output wires are shown in the upper portion of synthesis circuit 155; the first wire 161 on the left is divided into three branch lines leading to corresponding inputs of computers 1201,1202 and 1203, respectively, so as to deliver a reference voltage thereto; the second wire 154 is connected to the clock output illustrated in FIG. 9, and the third wire 162 is connected to the pre-positioning circuit illustrated in FIG. 8. These connections are found in the lower portion of each computer. On the right-hand side of the synthesis circuit 155 are also three output wires, namely a wire 163 leading to computer 1201 connected to the flashers for transmitting the warning orders, a wire 164 connected in parallel to computers 1202 and 1203 for transmitting inhibiting or strobe orders, and a wire 165 connected to computer 1203 alone for transmitting validation orders in connection with the lighting system thereto.

Computer 1201 comprises two outputs RG and RD connected to the energizing coils 146 and 147, respectively, of a pair of noise-producing relays associated with flashers 140 for the direction indicators. Computer 1202 has two outputs $R_1$ and $R_2$ connected to the pair of coils 142 and 143, respectively, for energizing and driving the windshield wiper motor 160 at the desired wiper blade speed. Finally, computer 1203 has two outputs RC and RP connected to the energizing coils 144 and 145 concerning the relays for dimmed headlights 151 and main beam headlights 150, respectively.

Figure 8:
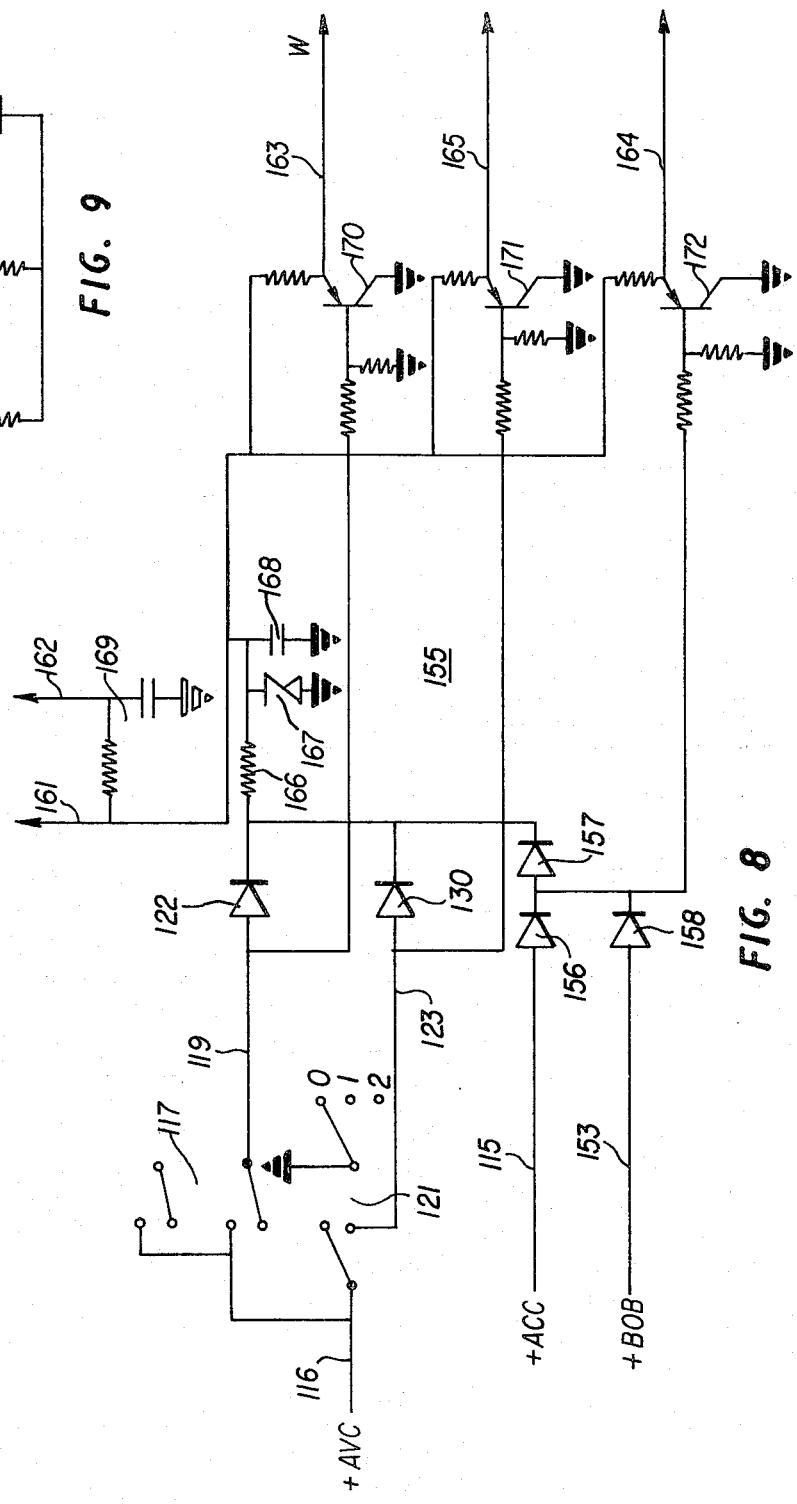
FIG. 8 illustrates a typical form of embodiment of the synthesis circuit incorporated in the block diagram of FIG. 7.

FIG. 8 illustrates a typical form of embodiment of the synthesis circuit 155 associated with the three computers or central units; namely flasher unit 1201 windshield wiper unit 1202 and lighting unit 1203. On the left-hand side of FIG. 8 the double switch 117 called warning contact and, thereunder, the general lighting switch 121, are illustrated. Thus, the following voltages can be fed to this synthesis circuit 155: via wire 119, the "+ warning" voltage: via wire 123, the "+ side lamps" voltage; via wire 115 the "+ACC" voltage and via wire 153, the "+ coil" voltage. These four input wires are connected to a diode-type logic circuit providing an OR function and comprising a diode 122 inserted in wire 119, a diode 130 inserted in wire 123, two diodes 156 and 157 inserted in series in wire 115 and a diode 158 inserted in wire 153. The outputs of diodes 157, 130 and 122 are interconnected and their common conductor extends beyond these diodes to constitute the output conductor 161, i.e. the conductor supplying current in common to the three central units 1201, 1202 and 1203 via a series connected resistor 166, a Zener diode 167 and a capacitor 168 in parallel between said conductor 161 and the ground. From an integrator RC 69 inserted between conductor 161 and the ground, another so-called pre-positioning conductor 162 extends likewise to the three central units 1201, 1202 and 1203. The inputs of diodes 122, 130 and 157 are connected to the relevant bases of three transistors 170, 171 and 172, respectively, via a series resistor and a grounded resistor branched on the wire between each series resistor and the transistor. The collectors of these three transistors are grounded and their emitters are each connected in parallel, via a series resistor, to conductor 161. The output 163 taken from the emitter of transistor 170, transmits the warning order to flasher central unit 1201; the output 164 connected to the emitter of transistor 172 transmits inhibition or strobe orders in parallel to the flasher, windshield wiper and lighting central units 1201, 1202 and 1203 and the output 165 connected to the emitter of transistor 171 transmits validation orders to the lighting central unit 1203.

Therefore, with this synthesis circuit 155 of FIG. 7 a common current supply to the three central units 1201, 1202 and 1203 is obtained via conductor 161. The diode logic circuit 122, 130, 156, 157 and 158 provides the function "+ warning OR+ACC. OR+side lamps OR+coils". If one of these four "+" energizes the synthesis circuit 155, the energizing voltage for the three central units 1201, 1202 and 1203 on the output conductor 161.

The synthesis circuit 155 also constitutes an input interface for inhibiting or validating one or a plurality of central units via outputs 163, 164 and 165. Thus, it is possible to memorize information in the flasher central unit 1201, windshield wiper central unit 1202 and lighting central unit 1203 if terminal "+ACC" via conductor 115 or terminal "+ coil" via conductor 153 energizes the synthesis circuit 155.

The integrator 169 having a time constant greater than that of the supply circuit comprising resistor 166 and capacitor 168 permits via conductor 162 common to the three central units 1201, 1202 and 1203 the proper pre-positioning of all the logic circuits, notably the flip-flops within said three central units when voltage is applied thereto.

Figure 9:
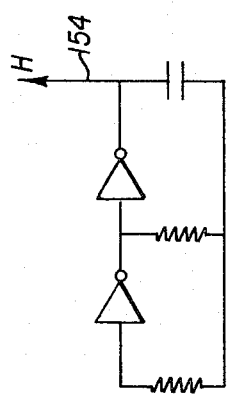
FIG. 9 illustrates a typical form of embodiment known per se, of a clock circuit.

FIG. 9 illustrates a typical form of embodiment of a clock beating at a frequency of, say, 768 Hz, which drives the three central units 1201, 1202 and 1203 via conductor 154. The three central units are entirely synchronized by the single, permanently beating clock of FIG. 9.

The REED relay 124, 125 of FIG. 6 is capable of detecting the failure of one of lamps 140.

For flasher central unit 1201 and windshield wiper central unit 1202, stopping is a priority. When a control is grounded permanently, for instance in case of a jammed control key, the corresponding function can be stopped by depressing the stop key, namely keys 103 and 109 of FIG. 6.

Figure 10:
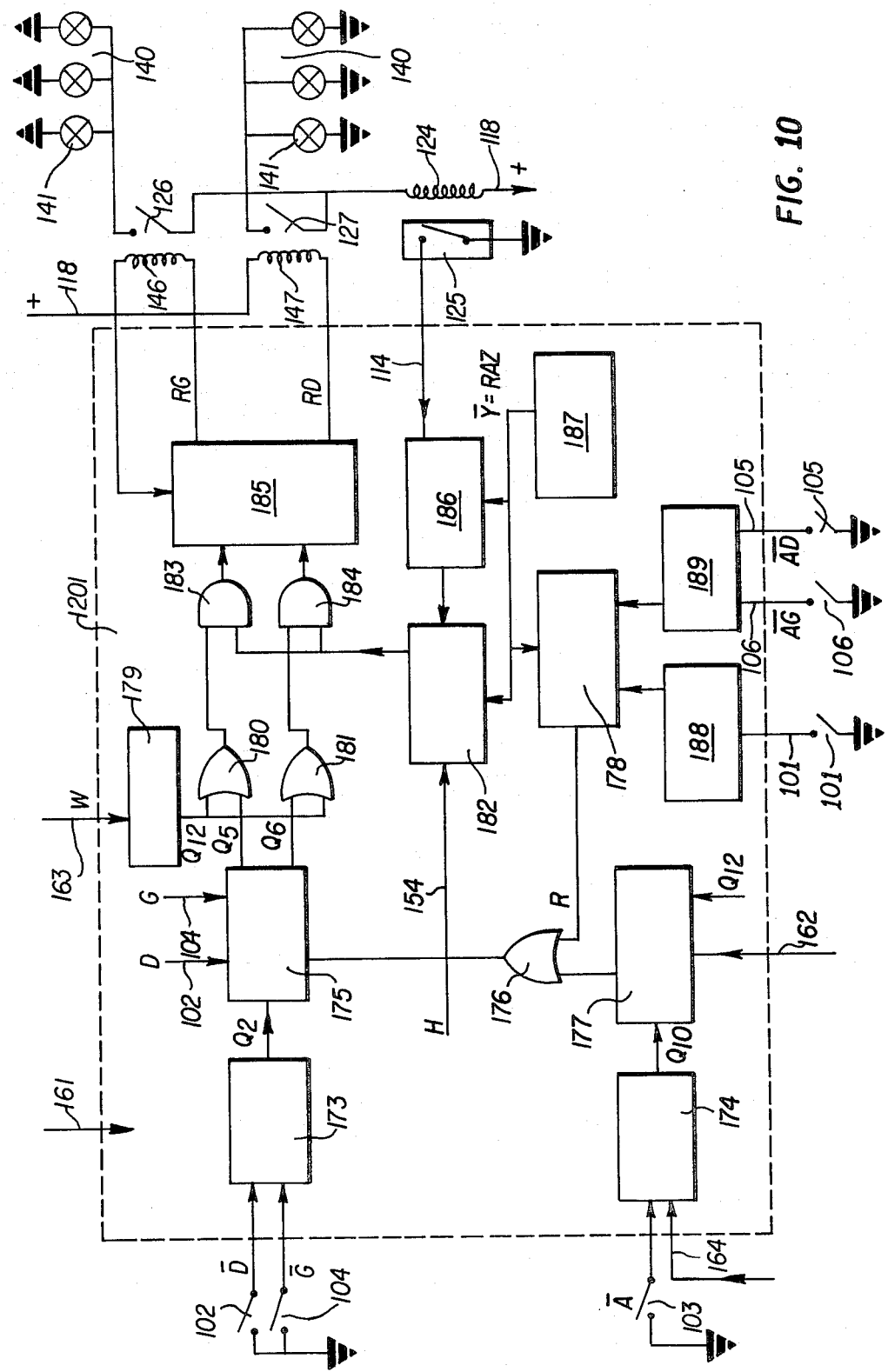
FIG. 10 is another block diagram of the flasher central unit of FIG. 9.

FIG. 10, which is a block diagram of the flasher central unit 1201 shown in the upper portion of FIG. 7, illustrates on a larger scale the computer 1201 within a dash-line rectangle. On the left-hand side of FIG. 10, transient switches 102, 104 and 103 are shown; these switches, possibly followed by logic inverter (not shown), are capable, when actuated by the driver of the motor vehicle, of delivering the reverse of the controls concerning the right-hand directional indicators, the left-hand directional indicators, and the stopping of flashers for input circuits 173 and 174. The detail of input circuit 173 will be discussed presently will reference to FIG. 11. Reverting to FIG. 10, the output $Q_2$ of input circuit 173 is connected to one input of a right-hand and left-hand memory circuit 175 to be described presently with reference to FIG. 12. The memory circuit 175 is also connected via another pair of inputs to transient switches 102 and 104, and also via a fourth input to an OR gate 176 connected in turn at one of its ends to a stop and pre-positioning circuit 117, and finally via its second input to the output of an automatic flasher return circuit 178. The flasher stop and pre-positioning circuit 177 is connected via a first input to the output of input circuit which delivers a signal $Q_{10}$, via a second input to the pre-positioning conductor 162 of FIG. 8, and receives via a third input a signal $Q_{14}$ from the output circuit 179 connected through its input to conductor 163 transmitting the warning signal W. This input circuit 170 also transmits a signal $Q_{12}$ to a second output connected in parallel as a first input to a pair of OR gates 180 and 181 connected through their second inputs to a pair of outputs of the right and left-hand memory circuit 175 delivering signals $Q_5$ and $Q_6$, respectively. Clock 154 of FIG. 9 is connected to a frequency divider 182 of which the output is connected in parallel as a first input to a pair of AND-function gates 183 and 184 connected via their second inputs to the outputs of OR function gates 180 and 181, respectively. These AND-function gates 183 and 184 have their outputs (acting as inputs) connected to an output interface 185 containing the power transistors for controlling the energizing coils 146 and 147 of the relays associated with flasher directional indicator lamps 140 and their pilot lamps 141.

The movable contact arm 125 of REED relay 124 is connected via wire 114 to one input of a current detecting circuit 186 having its output connected to frequency divider 182. This current detector circuit 186 will be described more in detail presently with reference to FIG. 13. A circuit 187 corresponding to the logic function: MOR warning, NOR flashers, which may be comprised of a NOR function logic gate and emitting under predetermined conditions a signal $\overline{Y}=RAZ$, has its output connected in parallel to the current detector circuit 186, to the automatic flasher return circuit 178 and to the frequency divider 182. Finally, the automatic flasher return circuit 178 is connected on the one hand to the transient switch 1 controlling the distance-responsive flasher return via an input circuit 188, and on the other hand to transient switches 105 and 106 for the right-hand and left-hand return of the flasher control member, respectively, which are possibly followed by inverters (not shown) via an input circuit 189.

In short, this circuit operates as follows: three transient switches 102, 104 and 103, denoted $\overline{D}$ (for "right-hand"), $\overline{G}$ (for "left-hand") and $\overline{A}$ (for "Stop") are adapted to control the flashing directional signal lamps 140. When a proper signal is generated in input circuit 173, i.e. when a signal having at least the same duration as a complete clock signal between two successive rising fronts of this last-mentioned signal, said input circuit 173 generates a signal $Q_2$ for memorizing the control pulse $\overline{D}$ or $\overline{G}$ in circuit 175. Then, the various devices of the current detecting circuit 186, frequency divider 182 and automatic circuit or device return 178 are validated by the output RAZ of circuit 187 assuming a low level. The flasher lamps 140 assume the "lighted" or "ON" phase immediately as the memorization begins. A servo-action or subservience beginning at the REED relay 125 and comprising the current detecting circuit 186 permits of obtaining a double beat rate of the noise-producing relays 146 and 137 and of the remaining flashing lamp 140 in case of failure of one or a plurality of lamps, as will be explained more in detail hereinafter.

The flashers 140 are stopped either by the transient switch $\overline{A}$ or 103 or by the automatic return circuit or device 178. Control $\overline{A}$ or 103 has priority over $\overline{G}$ and $\overline{D}$ or 104 and 102. Assuming, for instance, that $\overline{D}$ is grounded permanently due to the fact that the key or push-button of the corresponding transient switch is jammed, the flashers can be stopped by actuating $\overline{A}$. The warning control is made operative by causing a permanent+connection via wire 119 and double switch 117. A high lever will be obtained on wire 163 and also for signal $Q_{12}$ in parallel to $Q_5$ and $Q_6$. During the warning operation the memorization of signals $\overline{D}$ and $\overline{G}$ is inhibited by feeding signal $Q_{12}$ to stop control 177.

Figure 11:
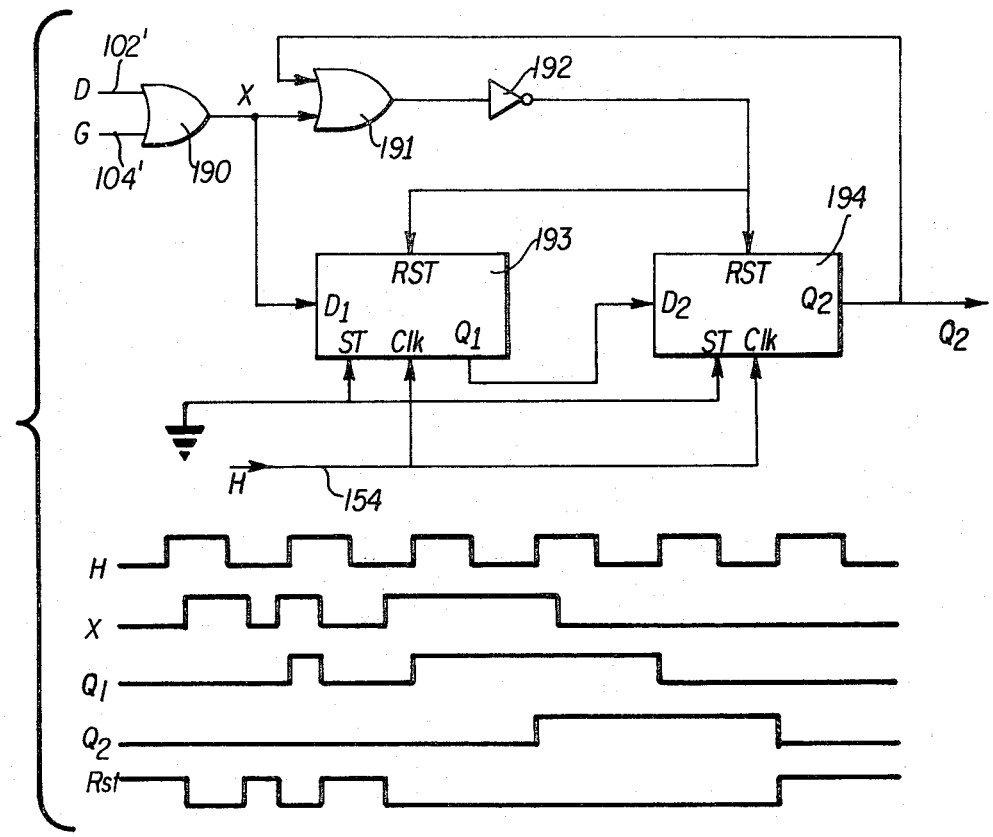
FIG. 11 illustrates a typical form of embodiment of a first input circuit of FIG. 10 together with the waveform diagrams of the various corresponding signals.

Referring now to FIG. 11 illustrating a typical form of embodiment of input circuit 173 with non-synchronized clock, together with the waveform diagrams of the main corresponding signals, this form of embodiment being also applicable to input circuit 174, a pair of input wires 102′ and 104′ are connected to an OR function gate 190 delivering a signal X at its output. This signal X is fed on the one hand as a first input to an OR function gate 191 and on the other hand as an input $D_1$ of a D-type flip-flop 193. The output $Q_1$ of this flip-flop 193 is fed to the input $D_2$ of a second D-type flip-flop 194 delivering a signal $Q_2$ at its output. A feedback path returns the output signal $Q_2$ as a second input to OR function gate 191 followed by a logic inverter 192 having its output connected in parallel to the reset input of flip-flops 193 and 194. The set inputs of flip-flops 193 are grounded and the clock of FIG. 9 is connected via its output wire 154 to the clock input of flip-flops 193,194.

Save if otherwise stated, all the flip-flops or univibrators used in the circuits described hereinafter are of the D-type manufactured by NATIONAL SEMICONDUCTORS and listed in their Catalogue under the reference No. 4013. In connection with the mode of operation of a D-type flip-flop No. 4013, it may be reminded that the signal at input D is transferred to the output Q in coincidence with the rising front of clock signal H. Setting and resetting are obtained at a high level of the corresponding signal, i.e. of the set signal or reset signal.

Referring now to the waveform diagrams at the lower portion of FIG. 11, it will be seen that the notion of signal proper at the input implies that the signal X preserves the value "one" at least during the interval between two successive rising fronts of the clock signal so that signal X or $D_1$ be transferred to output $Q_1$ of first flip-flop 193, and that, when this signal appears at the input $D_2$ of second flip-flop 194, the latter switches to its state "one" at its output $Q_2$ coincident with a rising front of clock signal H.

The input circuit 179 concerning the warning signal W will be discussed presently.

Figure 12:
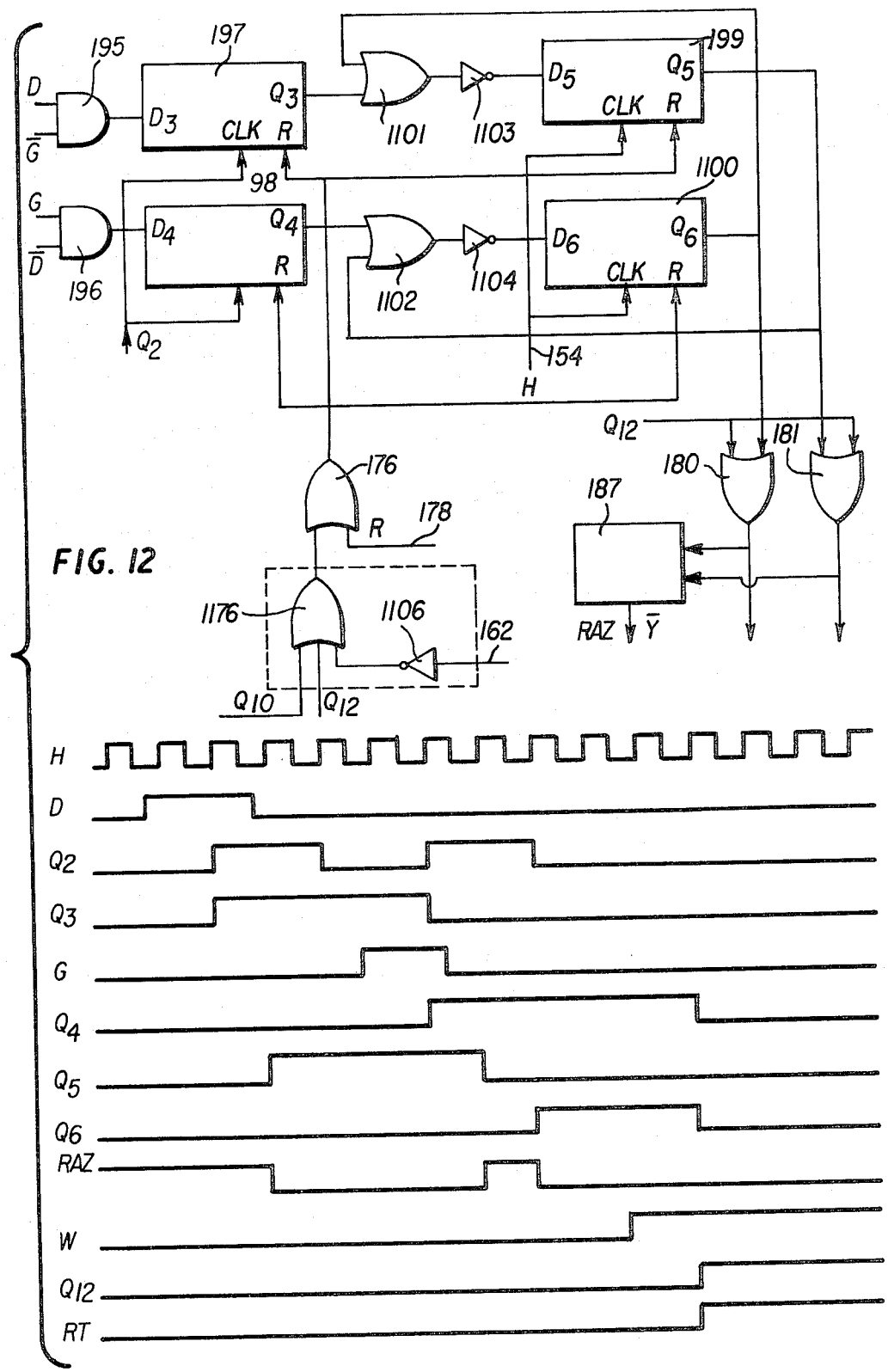
FIG. 12 illustrates a typical form of embodiment of the portion of the circuit shown in FIG. 10 concerning the data memorization when operating under warning conditions, together with the waveform diagrams of the various corresponding signals.

Referring to FIG. 12 concerning the memorization of flasher information, two AND-function input gates 195 and 196 receive the following information, respectively: the first gate 195 receives "Right-hand" and the reverse of "Left-hand", and the other gate 196 receives "Left-hand" and the reverse of "Right-hand". The outputs of these AND gates 195 and 196 are connected to the inputs $D_3$ and $D_4$ respectively of a pair of D-type flip-flops 197 and 198. The output $Q_3$ of flip-flop 197 is connected to the input $D_5$ of another D-type flip-flop 199 via a series connection comprising an OR gate 1101 and a logic inverter 1103. Similarly, the output $Q_4$ of flip-flop 198 is connected to the input $D_6$ of a D-type flip-flop 100 via the series connection of an OR gate 1102 with a logic inverter 1104. The output $Q_5$ of flip-flop 199 is connected on the one hand to one input of an OR gate 181 and on the other hand, as a second input, to the OR gate 1102 interposed between the output $Q_4$ of flip-flop 198 and the input $D_6$ of flip-flop 100. Similarly, the output $Q_6$ of flip-flop 1100 is connected on the one hand to one input of an OR gate 180 and on the other hand, as a second input, to the OR gate 1101 interposed between the output $Q_3$ of flip-flop 197 and the input $D_5$ of flip-flop 199. The clock inputs of flip-flops 197 and 198 are connected in parallel to the output $Q_2$ of flip-flop 194 of FIG. 11. The general clock of the system is connected via wire 54 to the clock inputs of flip-flops 199 and 1100. The OR gate identified at 176 in FIG. 10 is connected in parallel to the reset inputs of four flip-flops 197, 198, 199 and 1100. As in the case illustrated in FIG. 10, the OR gate 176 of FIG. 12 has one input connected to the output of the automatic flasher return circuit 178 and another input connected to the stop and prepositioning circuit 177 within which it is connected to the output of another logic OR gate 117 receiving at its input: signal $Q_{10}$ from input circuit 174 of FIG. 10, signal $Q_{12}$ from input circuit 179 of FIG. 10, and a third signal from the propositioning circuit 62 of FIG. 8 via a logic inverter 106. The output of input circuit 179 transmitting signal $Q_{12}$ is still connected in parallel as a second input to OR gates 180 and 181 having their outputs connected as inputs to circuit 187 of FIG. 10 which generates at its output the return signal $\overline{Y}$ (RAZ) for the current detector circuit 186, the frequency divider 82 and automatic flasher return circuit 178, respectively. Circuit 187 is of the negative logic type expressing NEITHER $Q_5$, NOR $Q_6$, NOR $Q_{12}$=RAZ. The outputs of gates 180 and 181 (FIG. 8) are also connected to the inputs of AND gates 183 and 184 of FIG. 10.

The waveform diagrams at the lower portion of FIG. 12 illustrate the change, as a function of time, of the main signals appearing at the main points of the circuit of FIG. 8, notably of signals $Q_3$, $Q_4$, $Q_5$ and $Q_6$ at the outputs of the four flip-flops 197, 198, 199 and 1100 in case the following signals appear at the input of the circuit of FIG. 7.

(1) An inherent signal D producing a signal $Q_2$ at the output of flip-flop 194, which is memorized in flip-flop 197 at $Q_3$ and causes signal $Q_5$ to be transmitted from the output of flip-flop 199;

(2) after a D→G inversion (i.e. from right to left) an inherent signal G memorized in flip-flop 198 as $Q_4$, which causes a signal $Q_6$ to be generated at the output of flip-flop 1100.

The last three lines of the waveform diagrams of FIG. 8 illustrate the signals obtained in case of warning operation (W). The fourth line from the bottom of these waveform diagrams shows that the RAZ signal is at value "one" when the system is inoperative:

RAZ=$\overline{Y}$=NOR flashers, NOR warning, and also assumes the value "one" during one clock period during a D⇌G inversion.

With this signal it is possible to reset the assembly comprising the return circuit 178, the current detecting circuit 186 and, more particularly, the frequency divider 182 of FIG. 10. Thus, it is possible to energize the lamps 140 and 141 immediately when actuating controls 102 or 104. Similarly, during a D⇌G inversion, for example, the left-hand lamps are lighted instantaneously. In actual practice, the first lighting-up is attended by a delay of a few milliseconds.

During the warning operation, a "one" is fed in parallel with signals $Q_5$ and $Q_6$ via OR gates 180 and 181. A "one" is also fed to the reset input R of flip-flops 197, 198, 199 and 1100 by means of a signal $Q_{12}$ in order to prevent the memorization of a D (right) or G (left) signal.

Should two "D" and "G" controls be actuated simultaneously, if an increasing front of signal H separates the occurrence of these two control actions, only the first one is taken into account. If not, the system remains inoperative due to the functions D and $\overline{G}$ on AND gate 195, and functions G and $\overline{D}$ on AND gate 196.

Figure 13:
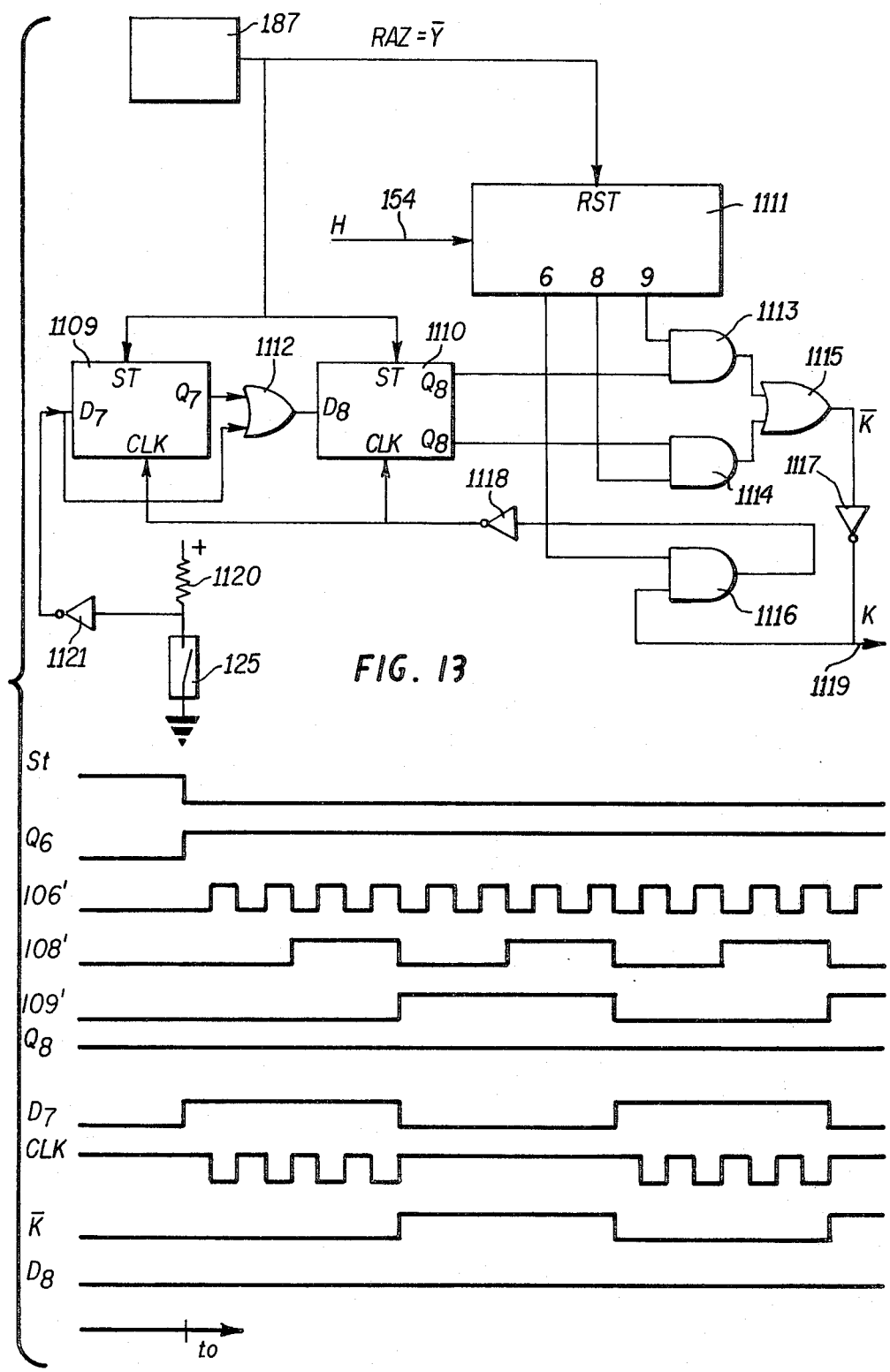
FIG. 13 illustrates a typical form of embodiment of the circuit portion of FIG. 10 concerning the detection of the flasher intensity, together with the waveform diagrams of the various corresponding signals as obtained when both lamps are in operation.

According to FIG. 13, illustrating a typical form of embodiment of the circuit 186 of FIG. 10 in connection with the current detection for flashers 140, this circuit comprises essentially a pair of D-type flip-flops 109 and 1100, and a complete flip-flop 1111 of the type referenced CD 4040 in the catalogue of NATIONAL SEMICONDUCTORS. This composite flip-flop 1111 constitutes a twelve-stage counter consisting of twelve series-connected flip-flops. It will be seen that the signal frequency is logically divided by two from one flip-flop to the next flip-flop. In the composite flip-flop 1111 employed in the present invention the signals are picked up at the output of the flip-flops constituting ranks 106′, 108′ and 109′. A circuit comprises in series between ground and "+ supply" terminal a resistor 1120 and also the movable contact arm 125 of the REED relay. The input $D_7$ of flip-flop 1109 is connected to this circuit at a point common to resistor 1120 and movable contact arm 125 of said REED relay via a logic reversing switch 1121. The output $Q_7$ of this flip-flop 1109 is fed as a first input to the OR gate connected via its second input to a wire leading to input $D_7$ of flip-flop 1109. The output of OR gate 1112 is fed to the input $D_8$ of the second flip-flop 1110 having its outputs $Q_8$ and $\overline{Q}_8$ connected to the inputs of a pair of AND logic gates 1113 and 1114, respectively, these two logic gates 1113 and 1114 receiving as a second input the outputs 109 and 108, respectively, of composite flip-flop 111. The outputs of AND logic gates 1113, 1114 are fed as inputs to an OR logic gate 1115 having its output connected to a logic inverter 1117 having in turn its output adapted to transmit a rate-setting signal K via wire 1119, said signal K being superposed in the AND logic gates 183 and 184 to the control signals, respectively, received by the energizing coils of noise-producing relays 146 and 147 actuating the flashers 140 according to the arrangement shown in FIG. 10. The output of logic inverter 1117 is connected to one input of a logic AND gate 1116 having its second input connected to the output 105 of composite flip-flop 1111. The output of this AND logic gate is connected through a logic inverter 1118 to the clock inputs of flip-flops 1109 and 1110. The circuit 187 already illustrated in FIGS. 110 and 112 and emitting a reset signal $\overline{Y}$ has its output connected on the one hand to the reset input of composite flipflop 1111 and on the other hand, in parallel, to the inputs for setting to "one" the single D-type flip-flops 1109 and 1110.

Figure 14:
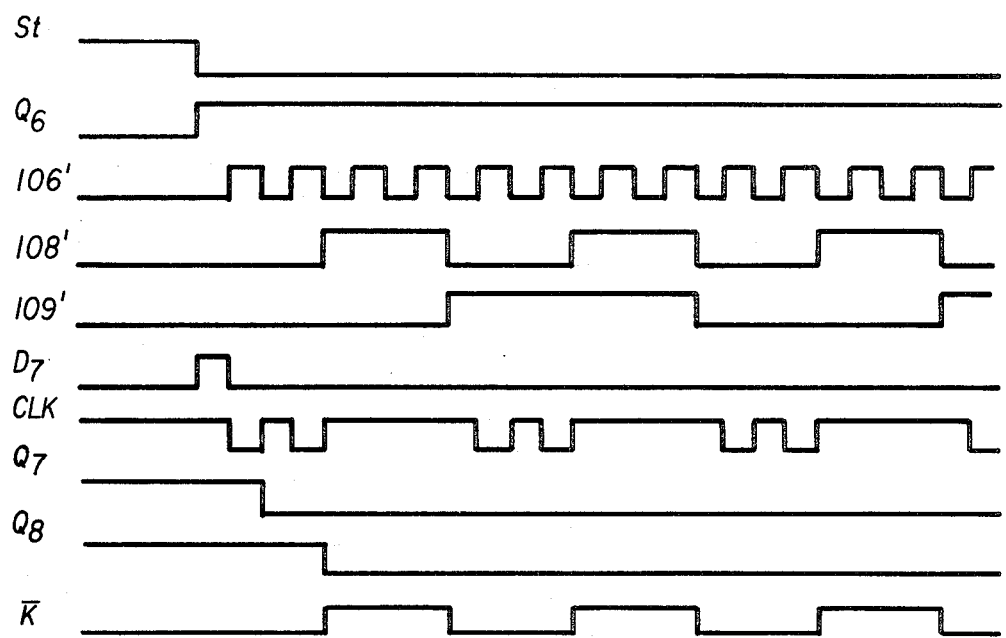
FIG. 14 illustrates the waveform diagrams of the various signals concerning the circuit of FIG. 13 in case only one lamp is operative.

The waveform diagrams in the lower portion of FIG. 13 illustrates the evolution of the main signals concerning the operation of the circuit of FIG. 13 in case two flashing lamps, on one side of the motor vehicle, operate simultaneously. A comparison may be made between these waveform diagrams and those of FIG. 14 illustrating the evolution, during the same time period, of the same signals in case only one lamp is lighted. The purpose of this arrangement is to impose a double rate of flashing to the lamp and to the noise-producing relay controlling the same in case of failure of one of the two lamps. If both flashing lamps 140 intended for simultaneous operation are lighted intermittently as required, the REED relay 124, 125 beats at the flasher frequency. If only one lamp is on or in operation, the REED relay is closed only briefly when the current draw occurs if the lamp is cold. This effect is observed through a pulse shown in FIG. 14, line 6, in the signal received by input $D_7$ of flip-flop 1109. The difference with the corresponding signal shown in FIG. 13, line 7, is clearly visible. In the diagram of FIG. 14 it will also be seen that the output $Q_8$ assumes the state of $D_7$ when the lamps are lighted and at a time when the current flowing through lamps 140 has assumed a permanent value. The memorizations take place on the ascending fronts of clock signal Clk (see FIGS. 13 and 14). If we compare the penultimate line of the waveform diagrams of FIG. 13 and the last line of the waveform of FIG. 14, we see that the frequency of rate-setting signal K, when a single lamp 140 is operative, is twice that of signal K in case both lamps 140 are operative, so that the desired requirement is met. The flashing lamps 140 are lighted when signal K is at its lower value.

Figure 15:
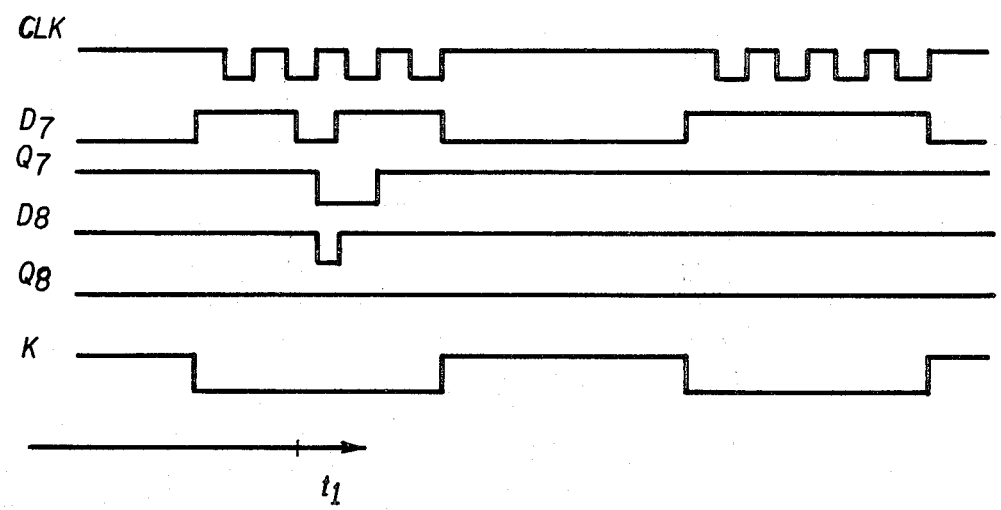
FIG. 15 illustrates explanatory waveform diagrams concerning the various signals obtained during the operation of flip-flop D7-Q7 of FIG. 13 in a particular case.

The waveform diagrams of FIG. 15 relate to the operation of flip-flop 109′ in the specific case where the driver causes the main beam headlights to flash so that the battery voltage undergoes a considerable temporary drop attended by the opening of REED relays 124, 125, when both directional signal lamps are lighted. Assuming that at a time $t_1$ shown in FIG. 11 a stray opening of REED relay 125 is caused by said battery voltage drop, the signal at the input $D_7$ of flip-flop 1109 assumes a zero value during a short time as illustrated in line 2 of FIG. 15. Line 3 illustrates the output signal $Q_7$ resulting therefrom and line 4 shows the corresponding input signal $D_8$ in the second flip-flop 1110. Line 5 shows the corresponding signal $Q_8$ emitted from the second flip-flop and having the same waveform as in the general case illustrated in FIG. 13, line 6, of the waveform diagrams. Finally, it will be seen that the rate setting signal K remains at the simple frequency, which is the purpose contemplated.

Most directional indicators or signal flashers mounted on motor vehicles have the automatic return function. This return movement is obtained as a rule through fully mechanical means by using friction elements or a cam restoring the control lever to its initial or inoperative position. In case the flasher control is such as to prevent the mounting of direct return means, pickups may be provided for instance in the vicinity of the steering wheel hub for performing an automatic return action.

Figure 16:
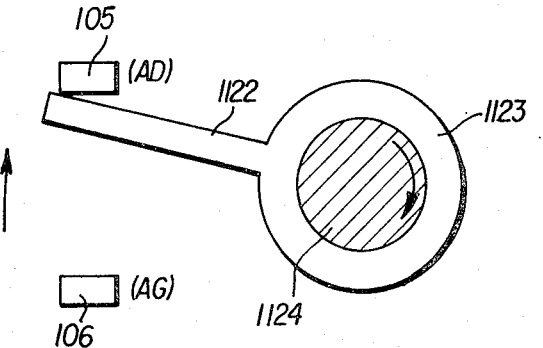
FIG. 16 illustrates diagrammatically a mechanical system for determining the direction of rotation of the steering wheel.

According to a specific form of embodiment of the present invention and as illustrated in FIG. 16, a pair of contacts AD and AG are provided for determining the direction of rotation of the steering wheel. An arm 1122 rigid with a friction ring 1123 surrounding the steering wheel hub 1124 is adapted to close a contact AG or AD according to the direction in which the steering wheel is rotated.

If, for instance, the driver actuates the left-hand flasher lamps, to stop this flasher automatically, it is necessary, after having turned the vehicle to the left, to rotate the steering wheel in the opposite direction, i.e. to the right.

Therefore, the left-hand stop contact AG will close when the steering wheel is rotated to the left; for this purpose, microswitches or REED relays may be used. Similarly, the right-hand stop contact AD is closed when the wheel is rotated to the right or clockwise.

From the time the directional signal lamps are actuated, to stop and put out these lamps automatically it is necessary:

if the left-hand signal lamps are lighted intermittently, to close contact AG, then, to close the opposite contact.

Now to avoid either external strays, or strays caused by contact rebounds, a single input cell 189 consisting of a pair of D-type cascade-mounted flip-flop as in the example shown in FIG. 11 in combination with flip-flops 193 and 194, except for the input signals, is used.

Figure 17:
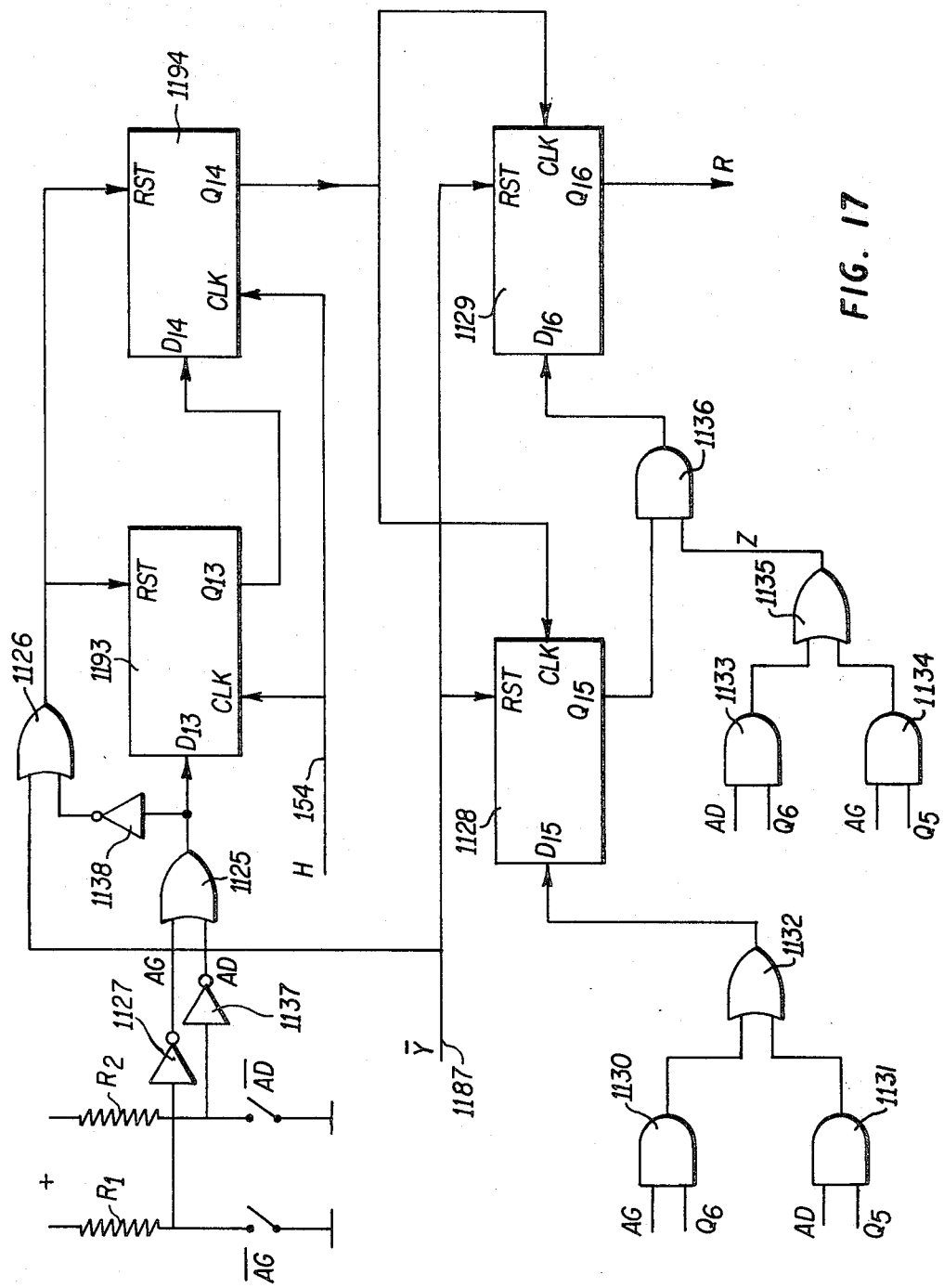
FIG. 17 illustrates a typical form of embodiment of a flasher return circuit operable by reversing the direction of rotation of the steering wheel.
Figure 18:
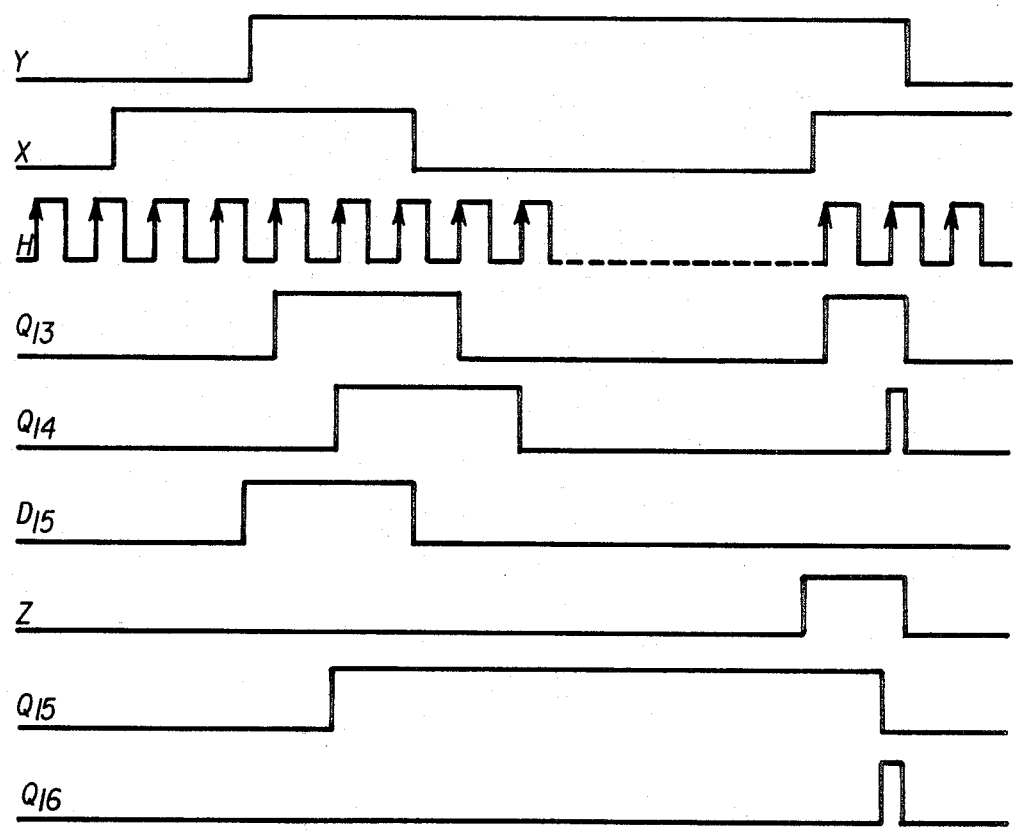
FIG. 18 illustrates the waveform diagrams of the various signals in the circuit of FIG. 17.

FIG. 17 illustrates a typical form of embodiment of an automatic flasher returning circuit based on the principle of utilizing a pair of pickups (AD) and (AG) of FIG. 16.

In FIG. 17, a pair of switches $(\overline{AD})$ and $(\overline{AG})$ have their movable contact arms grounded directly and their fixed contacts connected via resistors $R_1$ and $R_2$ to the "+ supply" terminal of the circuit in order to cause the "one" logic level to appear on said fixed contact when said switches $(\overline{AG})$ and $(\overline{AD})$ are open. The fixed contacts of these switches are connected through logic inverters 1127 and 1137 respectively to the inputs of an OR gate 1125 having its output connected to the input $D_{13}$ of a D-type flip-flop 1193 so as to deliver a signal X thereto. The output $Q_{13}$ of this flip-flop is connected to the input $D_{14}$ of a second D-type flip-flop 1194. The reset inputs of flip-flops 1193 and 1194 are connected to the output of an OR gate 1126 having its inputs connected on the one hand to the output of OR gate 1125 via a logic inverter 1138 and on the other hand to the output of circuit 187 of FIG. 13 which generates the signal $\overline{Y}$=RAZ. The clock inputs of flip-flops 1193 and 1194 are connected via wire 154 to the clock H of the system. Another pair of D-type flip-flops 1128, 1129 have their reset inputs connected to the output of circuit 187 of FIG. 13 generating the signal $\overline{Y}$. The clock input of flip-flops 1123 and 1129 is connected in parallel to output $Q_{14}$ of flip-flops 1194. The input $D_{15}$ of flip-flop 1123 is connected to the output of an OR gate connected at its two inputs to the corresponding outputs of another pair of AND gates 1130, 1131 receiving at their inputs the signals AG and $Q_6$ of FIG. 12, in the case of gate 1130, and the signals AD and $Q_5$ of FIG. 12, in the case of gate 1131. The output $Q_{15}$ of flip-flop 1128 is connected to the input $D_{16}$ of the flip-flop 1129 via an AND gate 1136 of which the second input is connected to the output of an OR gate so as to receive a signal Z therefrom, said gate 1135 having its two inputs connected to the relevant outputs of another part of AND gates 1133 and 1134 receiving at their inputs the signals AD and $Q_6$ of FIG. 8 in the case of gate 1133, and signals AG and $Q_5$ of FIG. 8 in the case of gate 1134. The signals AG and AD are recovered at the outputs of logic inverters 1127 and 1137 respectively. The output $Q_{16}$ of flip-flop 1129 corresponds to wire 178 of FIG. 12 leading to the OR gate 176 having its output connected to the reset inputs of flip-flops 197, 198, 199 and 1100 of FIG. 12. As already explained in the foregoing, both flip-flops 1193 and 1194 are cascade mounted so that the second flip-flop 1194 delivers a signal $Q_{14}$ only if the input signal at AG or AD has been adequate during a complete period or cycle of clock H, this notion having been explained in the foregoing with reference to FIG. 11.

The invention is in no way limited to the mode of realization illustrated and described and which has been given only for the sake of an example. It is possible for one skilled in the art to think of variations such as, for instance, replacing the REED ampules with detection coils each possibly followed by an amplifier and a signal-shaping circuit. Another variant would be to replace the configuration of magnet 4 and REED ampules 5, 6 with a photoelectric arrangement, the movable arm 3 carrying at its free end 4 a light source such as a light-emitting diode putting out a limited-area light spot and the REED ampules 5 and 6 being replaced by photo diodes each set behind a mask cut in such a way that each of these photo-diodes can only receive the bundle of light emitted by the light-emitting diode to the extent that the latter at the end of the arm 3 has turned to a predetermined angle, so that the light spot from the emitting diode then falls on one of the photodiodes to generate a signal in the electrical circuit associated with the photo diode.

What is claimed as new and desired to be secured by Letters Patent of the United States is:

1. An electromechanical arrangement for automatic return of an electronic directional indicator placed on a steering column of a motor vehicle, which comprises:

a housing supported on the steering column;

electrical contacts on the housing for connection to an electrical circuit;

a movable arm carried by the housing and having means at one end thereof in engagement with the steering column for imparting rotation to the arm when the steering column is rotated;

electrical switch means in the housing positioned so as to be adjacent an opposite end of the movable arm when the movable arm is rotated in one direction or another in response to rotation of the steering column and contacting said electrical contacts;

stop means at a predetermined angle on each side of a plane of symmetry of said housing, fixedly connected to the housing at the same angular and radial distance on either side of the plane of symmetry, for stopping the arm in predetermined juxtaposed relationship with the switch means;

means carried by the arm at said opposite end thereof for operating the switch means in response to predetermined, juxtaposed relationship therewith, and free of mechanical interconnection therebetween, whereby operation of the switch means results in automatic return of a directional signal indicator connected in the electrical circuit;

wherein said means for operating the switch means comprises a magnet, and said switch means comprises flexible-strip switches in glass bulbs; and wherein said switch means are in a plane parallel to that in which said movable arm travels in the course of its rotation and are situated so as to be farthest apart at their ends nearest the steering column, with an acute angle being formed between their longitudinal directions.

2. An electromechanical arrangement as set forth in claim 1 which further comprises:

a trough for holding each of said flexible-strip switches in glass bulbs wherein terminals for said switch means are connected by soldering or by crimping to brass or copper clips, connected to said housing, forming conducting leads.

3. An electromechanical arrangement as set forth in claim 2 wherein one of said bodies of the housing includes an opening formed therein within which said clips project so as to constitute the electrical terminals for external connection thereto to said electrical circuit.

4. An electromechanical arrangement as set forth in claim 2 wherein: each said trough holding said flexible-strip switches is situated in a plane parallel to that in which the movable arm travels in the course of its rotation.

5. An electromechanical arrangement as set forth in claim 1 which further comprises: a second magnet of reverse polarity from that of said magnet carried by said movable arm situated near the vertex of said acute angle.

6. An electromechanical arrangement for automatic return of an electronic directional indicator placed on a steering column of a motor vehicle, which comprises:
   a housing supported on the steering column;
   electrical contacts on the housing for connection to an electrical circuit;
   a movable arm carried by the housing and having means at one end thereof in engagement with the steering column for imparting rotation to the arm when the steering column is rotated;
   electrical switch means in the housing positioned so as to be adjacent an opposite end of the movable arm when the movable arm is rotated in one direction or another in response to rotation of the steering column and contacting said electrical contacts;
   stop means at a predetermined angle on each side of a plane of symmetry of said housing, fixedly connected to the housing at the same angular and radial distance on either side of the plane of symmetry, for stopping the arm in predetermined juxtaposed relationship with the switch means;
   means carried by the arm at said opposite end thereof for operating the switch means in response to predetermined, juxtaposed relationship therewith, and free of mechanical interconnection therebetween, whereby operation of the switch means results in automatic return of a directional signal indicator connected in the electrical circuit;
   a sleeve surrounding said steering column, and a mounting strap of a cable-crimping type which passes through lateral openings formed in the housing wherein said housing comprises two essentially identical bodies; and
   a shaft upon which said movable arm is mounted for supporting at least one roller at end portions of a roller and thruster means which constantly push said end portions of said roller towards said steering column which are disposed inside each of said identical bodies constituting said housing.

7. An electromechanical arrangement as set forth in claim 6 wherein: said means for operating the switch means comprises a magnet, and said switch means comprises a plurality of coil members.

8. An electromechanical arrangement as set forth in claim 6 wherein: said at least one roller comprises two parts and an inverted cup member separating said two parts a spring disposed in said cup coaxial with said shaft such that a bottom portion of said cup is constantly pressed by one end of the spring against one part of the roller while the movable arm is constantly forced by an opposite end of the spring against the other part of the roller.

9. An electromechanical arrangement as set forth in claim 6 wherein said thruster means comprises a hollow movable part sliding inside each of said identical bodies making up said housing, parallel to one wall of the body constituting a cover of the thruster means and further comprising a spring positioned therein pressing against a part of the body which is essentially perpendicular to the cover of the thruster means and tending to constantly push a bottom portion of the hollow movable part away from the part of the body essentially perpendicular to the cover.

* * * * *